Dec. 9, 1941.   R. R. R. SARAZIN   2,265,747
VIBRATION DAMPING DEVICE
Original Filed July 18, 1936

Inventor:
Raoul Roland Raymond Sarazin,
Bailey & Pearson
Attorneys

Patented Dec. 9, 1941

2,265,747

UNITED STATES PATENT OFFICE 2,265,747

VIBRATION DAMPING DEVICE

Raoul Roland Raymond Sarazin, Saint-Prix, France

Original application July 18, 1936, Serial No. 91,443. Divided and this application January 21, 1938, Serial No. 186,257. In France May 29, 1936

1 Claim. (Cl. 74—604)

The present application is a division of my application Ser. No. 91,443 filed July 18, 1936, now Patent No. 2,137,591, for Vibrations damping devices.

The present invention relates to devices for damping the vibrations resulting from the operation of engines.

The object of the present invention is to provide a device of this kind which is better adapted to meet the requirements of practice than similar devices used for the same purpose up to the present time.

The essential feature of the present invention consists in pivotally and eccentrically mounting on a crank web of the engine crank shaft a pendular mass arranged to oscillate in the direction of the axis of said shaft.

Other features of the present invention will result from the following detailed description of some specific embodiments thereof.

Preferred embodiments of the present invention will be hereinafter described, with reference to the accompanying drawing, given merely by way of example, and in which:

Fig. 1 diagrammatically shows, in vertical section, a radial engine with two banks of cylinders fitted with vibration damping devices according to the present invention;

The vibrations of internal combustion engines, or parts of said engines are frequently characterized, for at least some points of the driving shaft, by trajectories different from circles of revolution about the theoretical axis of rotation of said shaft.

In order to damp these vibrations, according to the present invention, I mount in a pivoting manner at least one pendulum on the driving shaft at a point remote from the axis of said shaft, in such manner that this pendulum can oscillate in the longitudinal direction of the shaft.

With such an arrangement, in the course of the rotary movement of the shaft, this pendulum is subjected to the action of the centrifugal force and, if the trajectory of the axis along which the pendulum is pivoted to the shaft corresponds with a circle of revolution about the theoretical axis of revolution of said shaft, this pendulum does not undergo any oscillation.

On the contrary, if the zone in question moves with a motion having a component parallel to the axis of revolution, the pendulum is started into oscillation and it exerts its vibration damping action.

In practice, this case may occur, for instance, in the following circumstances:

When the engine is supported in an overhung position with a rigidity which is not sufficient in order that the axis of revolution of the driving shaft may remain stationary, which is the case, for instance, of radial engines fitted on aircrafts and supported at the front or at the rear of the fuselage or a nacelle.

Another case is when, in an engine, the crankshaft itself is not sufficiently rigid.

Examining first the first case, it is found that, especially when elastic fixation devices are interposed between engine 1 and its support 2, the axis of revolution of the driving shaft moves along a kind of cone, generally more or less deformed, in such manner that the whole of the engine is given an irregular movement analogous to that of a spinning top. This takes place more especially in the case of radial engines having several banks of cylinders.

It then suffices to fit, in the manner above indicated, to a web of the crankshaft 3 of the engine, at least one pendulum 4, for greatly reducing the objectionable motion.

Figure 1:
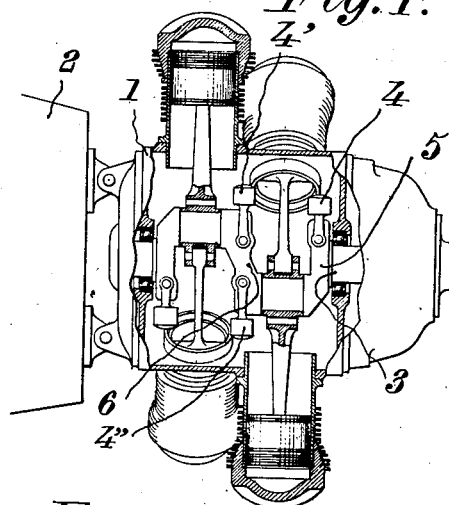

I may, for instance, as shown by Fig. 1, fix this pendulum at a certain distance from the axis of revolution on web 5 which is at the greatest distance from the part of the engine fixed to support 2. The pendulum can replace, at least partly, the balancing counterweight which was generally disposed at this place. In this case, this pendulum will play the part of both a counterweight and a vibration damping device.

Figure 2:
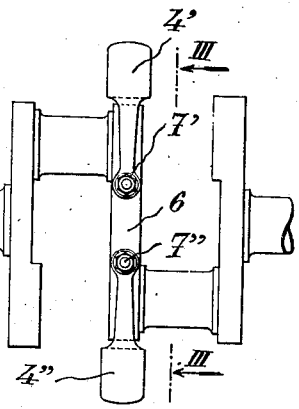
Fig. 2 is a lateral view of the crankshaft of an engine of the same kind, provided with vibration damping devices according to the invention.
Figure 4:
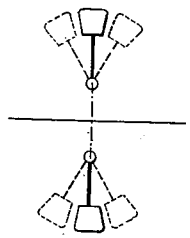
Figs. 4 and 5 are diagrammatical views illustrating modifications of the embodiment shown by the preceding figures.
Figure 3:
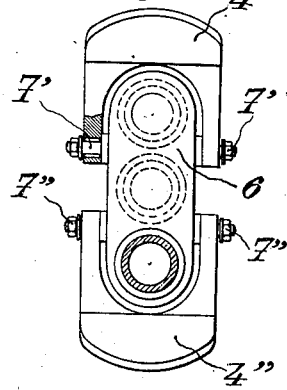
Fig. 3 is a sectional view on the line III—III of Fig. 2.

I might also, for instance in the case of a double radial engine (that is to say a radial engine including two banks of cylinders) provide two pendulums 4', 4" (Figs. 1 to 3) both pivoted, on either side of the axis of revolution, to the web that connects together the two crank pins of the crankshaft. These pendulums can then be made as shown by Fig. 3, that is to say they may be given the shape of a C surrounding one of the ends of web 6, to which each branch of the C would be connected through spindles 7', 7", advantageously provided with ball bearings or with roller bearings.

Anyway, the vibration damping effect will be obtained if the mass of the pendulums and their length are chosen in such a manner as to obtain a natural frequency the period of which is equal to the period of the vibrations to be damped.

Figure 5:
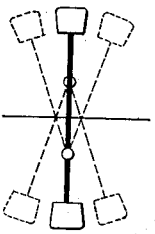

When, as it often occurs in practice, the vibrations to be damped have a frequency equal to one (or more accurately, a frequency equal to the number of revolutions of the driving shaft per second) the pendulums to be utilized should generally be monofilar pendulums. In any case, they should be pivoted at points remote from the axis of revolution. These points may be, with respect to said axis, either on the same side as the center of gravity of the pendulum (Figs. 1 to 4) or on the opposite side (Fig. 5).

Figure 6:
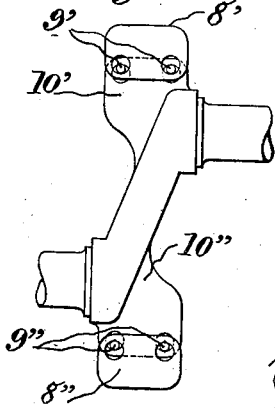
Fig. 6 is a view, similar to Fig. 2, showing a crankshaft provided with a vibration damping device according to another embodiment of the invention.

Examining now the case of the damping of bending deformations of crankshafts, it is found that it is generally advisable to make use of bifilar pendulums which, in this case also, are pivoted to the webs of the crankshafts. These pendulums may (for instance), be made as disclosed with reference to Fig. 6, including a mass 8' or 8" provided with holes through which pass, with a certain play, rollers 9', 9", which extend, also with a certain play, through holes provided in an element 10', 10", rigid with the crankshaft.

Of course, whether the pendulums that are employed are monofilar pendulums or bifilar pendulums, it may, in some cases, be advantageous to provide pendulums capable of oscillating in different radial planes, these radial planes being, for instance, at right angles to each other.

Figure 7:
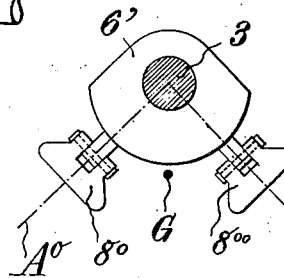
Figs. 7 and 8 are views, similar to Fig. 3, showing two driving shafts provided with means for damping vibrations, according to the present invention.
Figure 8:
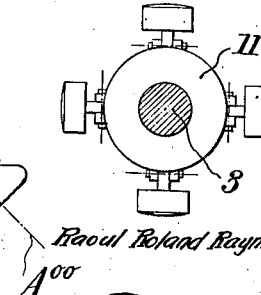

Thus, according to the circumstances, the following arrangement may be adopted:

*a.* I dispose, on the same web of a crankshaft, two pendulums, for instance bifilar pendulums, $8^o$, $8^{oo}$ (Fig. 7), adapted to oscillate in radial planes $A^o$, $A^{oo}$ at right angles to each other. The center of gravity of the whole of these two pendulums is located at the point where should be positioned the center of gravity of the balancing counterweight of the crank pin carried by the web in question, if pendulums $8^o$, $8^{oo}$ did not exist;

*b.* I dispose, upon the same plate 11, rigid with shaft 3, four pendulums, for instance monofilar pendulums, evenly distributed at 90° from one another about the shaft, as shown by Fig. 8.

Of course, many other arrangements of the same kind may be employed, according to the nature of the vibrations to be damped.

The operation and the advantages of a vibration damping device according to the present invention result sufficiently clearly from the preceding description of some specific embodiments thereof for making it unnecessary to give any further explanation.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claim.

What I claim is:

In connection with an internal combustion engine having a crankshaft including crank pins and crank webs, a device for damping vibrations which comprises, in combination, at least one part, rigid with one web, a pendular mass carried by said part, and bifilar suspension means for connecting said mass with said part at two points spaced longitudinally of the crankshaft, so as to permit pendular oscillations of said mass in the plane of said crankshaft.

RAOUL ROLAND RAYMOND SARAZIN.